(12) United States Patent
Laux

(10) Patent No.: US 7,080,453 B2
(45) Date of Patent: Jul. 25, 2006

(54) MANUAL APPARATUS FOR CUTTING CABLES TO SIZE

(75) Inventor: Steffen Laux, Berlin (DE)

(73) Assignee: Laux Industrie GmbH, Buchow-Karpzow (DE)

( * ) Notice: Subject to any disclaimer, the term of this patent is extended or adjusted under 35 U.S.C. 154(b) by 64 days.

(21) Appl. No.: 10/799,725

(22) Filed: Mar. 15, 2004

(65) Prior Publication Data

US 2005/0000094 A1    Jan. 6, 2005

(30) Foreign Application Priority Data

Mar. 15, 2003   (DE)   ................ 103 12 507

(51) Int. Cl.
*B26B 13/06*    (2006.01)

(52) U.S. Cl. ............... 30/92; 30/250; 30/349

(58) Field of Classification Search ............... 30/92, 30/94, 95, 244, 245, 249, 250, 251, 349, 30/260

See application file for complete search history.

(56) References Cited

U.S. PATENT DOCUMENTS

| | | | | |
|---|---|---|---|---|
| 119,041 | A | * | 9/1871 | Mix ............... 30/259 |
| 1,346,392 | A | * | 7/1920 | Whitaker, Jr. ............... 7/133 |
| 1,348,694 | A | * | 8/1920 | Bradley ............... 7/134 |
| 1,508,687 | A | * | 9/1924 | Gilley ............... 7/133 |
| 1,529,489 | A | * | 3/1925 | Leipold ............... 30/94 |
| 1,924,837 | A | * | 8/1933 | Crause ............... 7/109 |
| 4,670,983 | A | | 6/1987 | Ramun et al. |
| 4,779,342 | A | * | 10/1988 | Kobayashi et al. ............... 30/250 |
| 5,184,404 | A | * | 2/1993 | Chen ............... 30/250 |
| 5,307,565 | A | * | 5/1994 | Erbrick et al. ............... 30/251 |
| 5,590,470 | A | * | 1/1997 | Erbrick et al. ............... 30/250 |
| 6,766,581 | B1 | * | 7/2004 | Nordlin ............... 30/252 |

FOREIGN PATENT DOCUMENTS

EP    0 186 222 B1    10/1988

* cited by examiner

*Primary Examiner*—Hwei-Siu Payer
(74) *Attorney, Agent, or Firm*—Birch, Stewart, Kolasch & Birch, LLP

(57) ABSTRACT

Manual cutting tools for cutting cables, steel cord, rods to size, the cutting tools including a stationary cutting part connected to a stationary handle, and a movable cutting part adapted to be moved against the stationary cutting part by a movable handle via a transmission. Each of the stationary and movable cutting parts has associated therewith a concavely shaped replaceable cutting element mounted in a floating fashion.

11 Claims, 3 Drawing Sheets

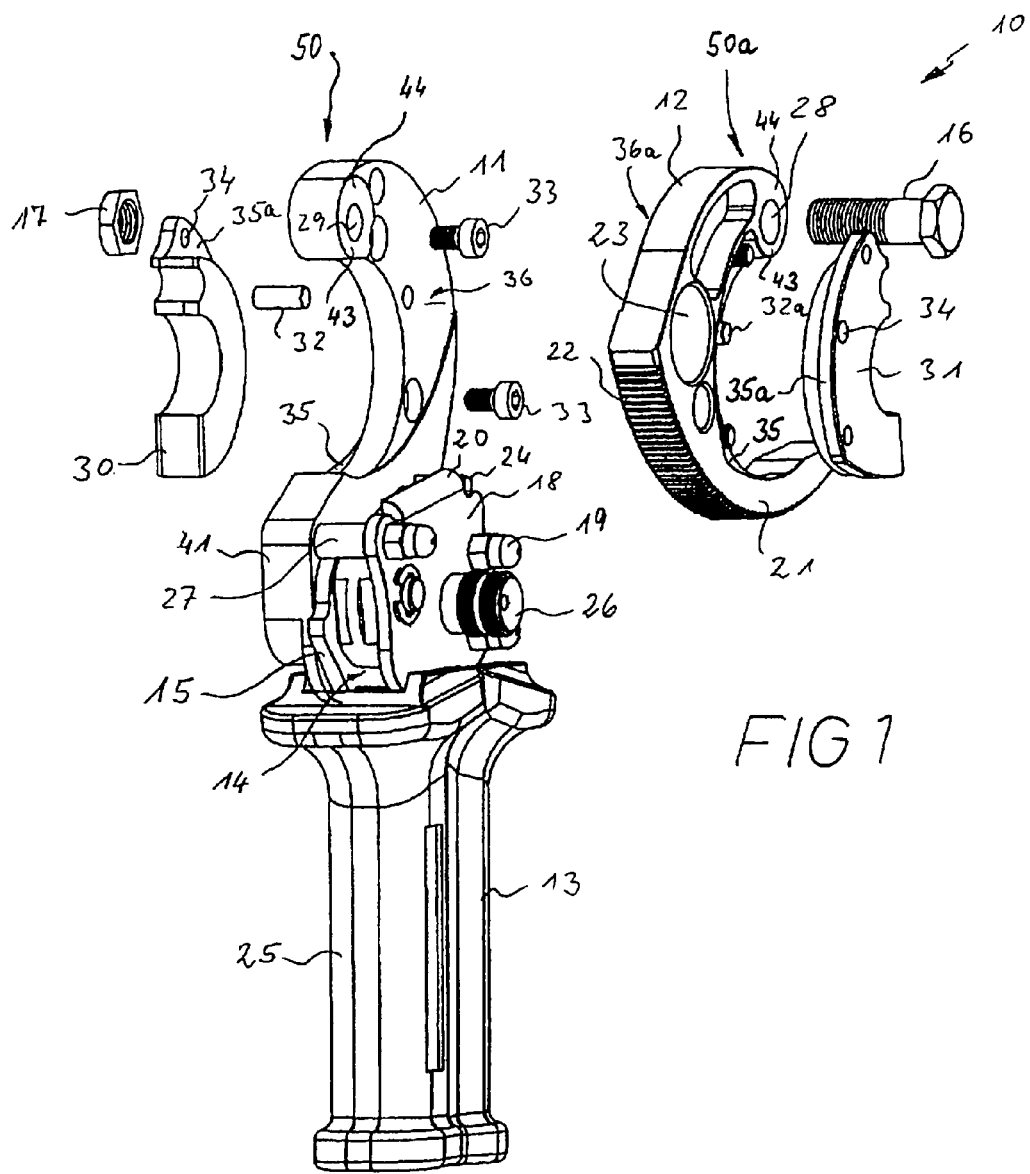
FIG 1
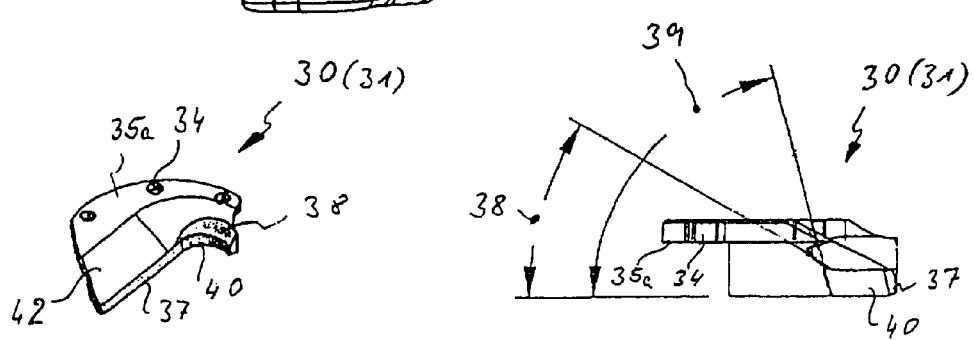
FIG 2
FIG 3

MANUAL APPARATUS FOR CUTTING CABLES TO SIZE

CROSS REFERENCE TO RELATED APPLICATION

This application claims priority on Application No. 103 12 507.8 filed in Germany on Mar. 15, 2003, the entire contents of which are hereby incorporated by reference and for which priority is claimed under 35 U.S.C. § 119.

BACKGROUND OF THE INVENTION

1. Field of the Invention

The present invention relates to a manual cutting tool for cutting cables, steel cord, rods to size, comprising a pair of movable cutting means one of which is connected to a stationary handle and the other one of which is adapted to be moved against the stationary cutting means by a movable handle and transmission means, said cutting means having associated therewith replaceable, concavely shaped cutting elements adapted to be connected in a frictional and shape lock.

2. Description of Background Art

Manual cutting tools of this kind are used to cut to the desired length cables, steel cords which are wound from cable drums, for example, for further processing. The required severing forces frequently are very high and can be applied through force transmitting means by means of handles adapted to be moved against each other. The force transmitting means allow the oppositely disposed cutting means to be slowly moved against each other while the applied forces are of a relatively low magnitude. The cutting means may be in the form of oppositely disposed angle shears or as a rotary knife of the type known by EP 0 186 222 B1, for example.

It has turned out that the cut will be particularly clean in case the strands to be severed are not sheared in the manner of a side cutter, as known by U.S. Pat. No. 4,670,983; instead, the cutting forces should act on the material to be severed in a manner to cause fracture to occur. This is obtained by means of the cutting elements acting onto the strands. Also, the cutting elements should be matched as well as possible to the strand to be severed as to size and shape.

The cutting means have to sustain relatively high mechanical loads and experience relatively high wear, depending on the material to be severed. In addition, they experience rough handling on construction sites and in similar dirty environments and they may be used to cut widely varying materials, all of which will often cause their utility to greatly degrade.

SUMMARY OF THE INVENTION

It is the object of the present invention to provide a manual cutting tool of the type described above which is suited for universal use and of which the usefulness can be maintained for extended periods of time by the application of relatively simple means.

This object is attained by cutting means having mutually facing guide shoulders thereon, with cutting elements having shoulders thereon by means of which they are inserted flush in guide shoulders of cutting means.

In another embodiment, the replaceable cutting elements having in their rear surfaces holding grooves by means of which they are floatingly mounted in a frictional and shaped-locked manner in cutting means on matingly shaped holding tabs located in the region of guide shoulders. The replaceable cutting elements are mounted to float in the cutting means, with the cutting means having centering means associated therewith for coupling to the cutting means for a perfect fit in a frictionally and shape-locked manner.

Further, in another embodiment, the replaceable cutting elements have in their rear surfaces holding grooves adapted to be effectively coupled in a frictionally and shape-locked manner with similarly shaped and radially inwardly facing holding tabs provided in the region of radially inward guide shoulders. The cutting means have shoulders in their mutually facing surfaces, with the cutting elements sunk flush with the surfaces into the shoulders of the cutting means.

These measures result in a manual cutting tool which enables components which wear out quickly under extreme stress to be quickly and simply removed and replaced by new components. Further, it enables cutting edges to be used of which the shapes and materials are matched to any application; in all such uses, the manual cutting tool as such will retain its basic utility and can be kept ready for a wide variety of operating conditions by using relatively simple means. Thus, if the cables to be severed are fiber glass cables, for example, the cutting elements may be ceramic.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein:

FIG. 1 shows an isometric view of a manual cutting tool having stationary cutting means and movable cutting means, the latter adapted to be moved against the stationary cutting means, with the respective cutting elements being replaceable;

FIG. 2 shows an isometric view of a cutting element having a low relief angle, a steep cutting angle and a concave edge radius;

FIG. 3 shows a side view of a cutting element of FIG. 2 with a segment shoulder adapted to be sunk;

As shown in FIG. 1, a manual cutting tool 10 essentially comprises a stationary cutting means 11 connected integrally to a stationary handle 13. A rotary knife 12 is adapted to be moved relative to stationary cutting means 11 by way of a stepdown transmission 14, not described in detail.

Figure 4:
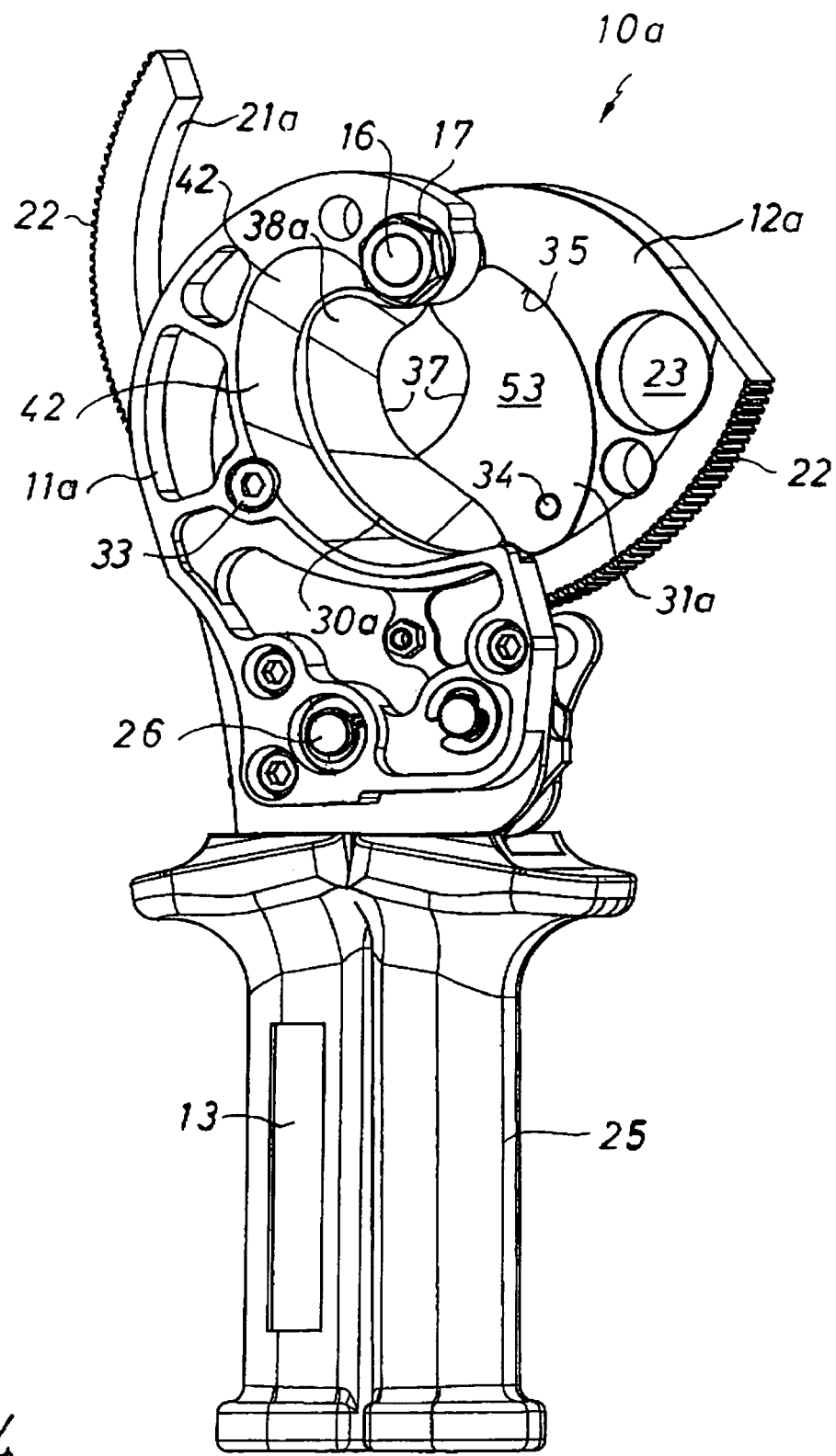
FIG. 4 shows an isometric view of a manual cutting tool having an increased arcuate rotary knife member and mutually supporting cutting elements mounted to float by means of holding grooves in holding tabs in guide shoulders on the cutting means.

Movable cutting means 12 has through its distal end 50a opposite handle 13 a pivot bore 28 adapted to be effectively coupled with a pivot bore 29 through stationary cutting means 11. Pivot bores 28, 29 receive a shank screw 16, which can be secured by a locknut 17. Alternatively, pivot bore 29 may have internal threads adapted to threadingly receive shank screw 16, which then is secured by means of locknut 17. Shank screw 16 serves as an axle for movable cutting means 12 and has left-handed threads thereon in order to keep it from loosening by itself as cutting means 12 pivots.

On its side opposite pivot bore 28, cutting means has an arcuate rotary knife member 21 provided with a series of teeth 22 on its outer surface. Teeth 22 are configured preferably to have a well-defined modulus.

To enable movable cutting means 12 to be moved relative to stationary cutting means 11, stepdown transmission 14 (not shown in detail) is provided. Stepdown transmission 14 is accommodated by a transmission casing (not shown in detail) covered by cover plate 18 and has a transport lever configured to form a toothing pawl 15. Pawl 15 is adapted to effectively engage teeth 22 on cutting means 12.

Cover plate 18 has an axially extending guide bead 20 directed against movable cutting means 12, said guide bead guiding arcuate rotary knife member 21 of cutting means 12 when engaged to be moved by pawl 15. Cover plate 18 is held by spacer sleeves 27 at a precise distance from base portion 41 of stationary cutting means 11. Spacer sleeves 27 receive casing screws (not shown in detail) retained by cap nuts 19.

Pawl 15 is moved by means of a movable handle 25 through stepdown transmission 14, with pawl 15 engaging teeth 22 on arcuate rotary knife member 21 on a tooth-by-tooth basis to slowly move movable cutting means 12 against stationary cutting means 11. A lock pawl 24 is provided in order to prevent teeth 22 from rebounding. Lock pawl 24 is configured to form a rocker element, with a retaining spring provided to bias it into engagement with teeth 22.

Movable handle 25 is adapted to be moved relative to stationary handle 13. In order to avoid any unintentional operation of cutting means 12, a lock shaft 26 is provided which enables manual cutting tool 10 to be locked. A handling aperture 23 is provided to enable cutting means 12 to be moved after successful use into its starting position in which it can encircle a cable to be severed. Handling aperture 23 enables arcuate rotary knife member 21 to be drawn over pawl 15 in the disengaged condition thereof so as to open manual cutting tool 10.

In accordance with the invention, stationary cutting means 11 has associated therewith a replaceable stationary cutting element 30 and movable cutting means 12 has associated therewith a replaceable movable cutting element 31. A centering pin 32 is provided to precisely fit and connect cutting element 30 to stationary cutting means 11 while centering pin 32a is provided to fit and connect cutting element 31 to movable cutting means 12, with element 31 secured in place against rotation by natural cutting pressure.

Centering pins 32, 32a are guided in a high-precision fit in centering bores 34. Threaded fasteners 33 are provided to frictionally and shape-lock cutting elements 30, 31 to cutting means 11, 12.

Cutting elements 30, 31 each have a shoulder 35a by which they are sunk against a guiding shoulder 35 in cutting means 11 or 12, respectively. The said sunk connections are configured to fit precisely and flush in surface 36 of cutting means 11 or in surface 36a of movable cutting means 12, respectively. They are honed in place so as to avoid any clearance and play which would be detrimental under the high transmitted forces occurring as the tool is operated.

As shown in FIG. 2, cutting elements 30, 31 have concave cutting radii 40 roughly corresponding to the contours of a cable or steel cord to be severed.

As shown in detail in FIG. 3, cutting elements 30, 31 have cutting edges 37. Cutting edges 37 of cutting elements 30, 31 are designed to have relatively flat cutting angles 39 which merge into relatively steep relief angles 38. Cutting angles 39 are about 70° and relief angles 38 are about 30°.

Cutting elements 30, 31 are replaceable and may be made of a variety of hard materials such as hardened steel or ceramic. They may variously be formed to have one or multiple curvatures so as to adapt them universally to any desired use.

Figure 5:
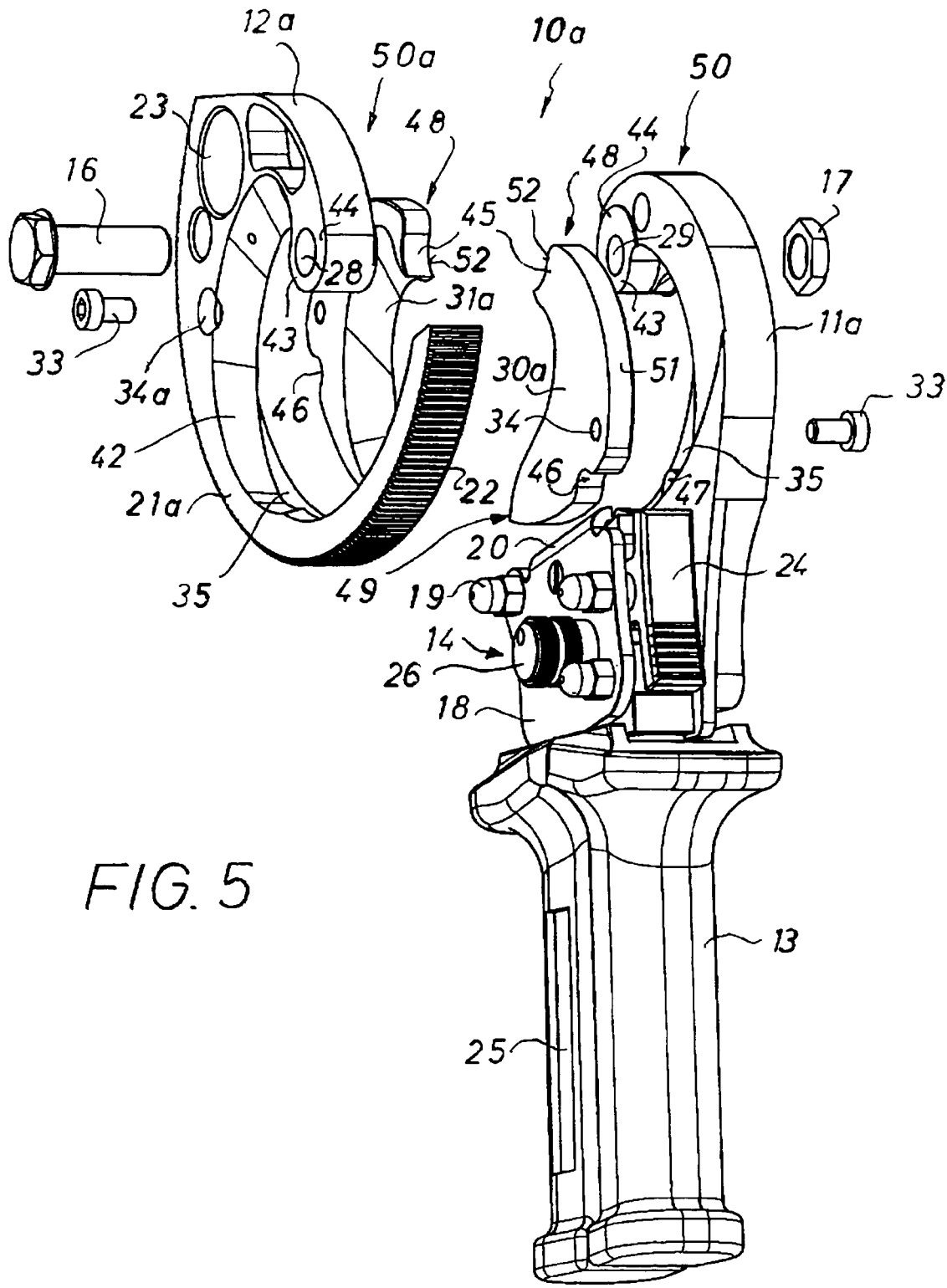
FIG. 5 shows an isometric exploded view of a manual cutting tool of FIG. 4.

Likewise, the manual cutting tool 10a shown in FIGS. 4 and 5 has stationary cutting means 11a and movable cutting means 12a mounted to be moved against the stationary cutting means. Stationary cutting means 11a is connected with a stationary handle 13, while movable cutting means 12a is adapted to be moved by a movable handle through stepdown transmission 14 (not shown in detail) against said stationary cutting means 11a.

Movable cutting means 12a has an arcuate rotary knife member 21a having dimensions corresponding to one half of a circle. On its radially outer surface, arcuate rotary knife member 21a has thereon a series of teeth 22 driven by said stepdown transmission 14 to be advanced towards the stationary cutting means; also, said teeth are engaged by a lock pawl (not shown in detail).

At their distal ends 50, 50a opposite handles 13, 25, respectively, in the assembled condition thereof, cutting means 11a, 12a have pivot bores 28 or 29 therethrough, respectively. Pivot bores 28, 29 receive a shank screw 16, which is secured by a locknut 17. Thus, movable cutting means 12a is mounted to be pivoted about shank screw 16 against stationary cutting means 11a.

Cutting means 11a, 12a each have a guide shoulder 35 extending along their radial inner surfaces. Guide shoulders 35 have opposite cutting elements 30a, 31a placed therein with their rear surfaces in a flush condition, each said cutting elements being shaped to be the mirror-image equivalent of the other. Cutting elements 30a, 31a are supported in guide shoulders 35 in a "floating" fashion.

In order to prevent floating cutting elements 30a, 31a from yielding in a radial direction, guide shoulders 35 have holding tabs 47 in the lower third thereof facing handles 13, 25, respectively, while cutting elements 30a, 31a have matching holding grooves 46. Holding tabs 47 are effectively coupled with holding grooves 46 in a precise fit so that radial escape will not be possible.

In order to align cutting elements 30a, 31a in place in a precise fit in guide shoulders 35, centering bores 34 are provided which are aligned with centering bores 34a in cutting means 11a, 12a. Threaded fasteners 33 may be passed through cutting means 11a, 12a in order to fix cutting elements 30a, 31a in place. Fasteners 33 are inserted through centering bores 34 to threadingly engage centering bore 34. Shims (not shown) may be placed in guide shoulders 35 to make up for varying thicknesses of cutting elements 30a, 31a.

With cutting elements 30a, 31a placed in guide shoulders 35, the cutting bevels 38a of cutting elements 30a, 31a should merge into cutting means 11a, 12a with a relatively flat angle. To this end, cutting means 11a, 12a are designed to have in the region of cutting elements 30a, 31a relatively flat cutting angles 42 to merge with corresponding relief angles 38 of cutting elements 30a or 31a, respectively. Depending on the material to be severed, such relief angles 38 may be selected to be different so as to allow soft material—such as copper cable—to bulge or swell out when cut.

For improved force transfer in the region of shank screw 16, pivot bores 28, 29 are disposed in asymmetric locations in the distal ends 50, 50a of cutting means 11a, 12a. This measure gives rise to radially outwardly located portions 44 of increased material thickness which inhibit axial movement of cutting elements 30a, 31a during a cut.

For the placement of cutting elements 30a, 31a in guide shoulders 35, their distal ends 50, 50a are provided along the radial inner surface thereof with asymmetric portions 43 of reduced material thickness which are disposed opposite radially outwardly located portions 44 of increased material thickness.

Cutting elements 30a, 31a have at the front free ends 48 thereof arcuate abutment portions 52 conforming with reduced thickness portion 43 in a frictionally and shape-locked manner. In the area of arcuate abutment portions 52, cutting elements 30a, 31a have axially extending chamfers 45 which allow them to be placed under the respective opposite increased thickness portion 44 when movable cutting means 12a is in its open position.

Cutting elements 30a, 31a are floated in place between holding grooves 46 and asymmetric increased thickness portions 44. The opposite inner free ends 49 may be exposed, with the opposing cutting elements 30a, 31a supporting each other here by their surfaces 53 in a precise fit.

These measures allow cutting elements 30a, 31a to be cut and ground to shape from fully hardened or fully hardenable solid rod material. They facilitate the relatively inexpensive mass production thereof, and they are simple and easy to replace. For weight reduction, cutting means 11a, 12a may be injection molded of a light-weight metal alloy, for example.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A manual cutting tool for cutting cables, steel cord, rods to size, comprising:
   stationary cutting means connected to a stationary handle; and
   movable cutting means adapted to be moved against the stationary cutting means by a movable handle and transmission means,
   said stationary and movable cutting means having associated therewith replaceable, concavely shaped cutting elements adapted to be connected in a frictional and shape lock,
   the stationary and movable cutting means having pivot bores through their front free ends opposite the handles,
   said pivot bores having passed therethrough a shank screw about which said movable cutting means can be pivoted relatively to the stationary cutting means,
   said pivot bores extending asymmetrically through the front free ends of the stationary and movable cutting means, and said front free ends having formed thereon a radially outer portion of increased material thickness and a radially inner portion of reduced material thickness, and
   the stationary and movable cutting means having mutually facing guide shoulders, and the cutting elements having shoulders for inserting the cutting elements flush into the guide shoulders of a respective one of the stationary and movable cutting means.

2. The manual cutting tool as in claim 1, wherein the cutting elements having in the region of their shoulders radially inwardly extending chamfered cutting angles merging with corresponding relief angles of the cutting elements.

3. The manual cutting tool as in claim 1, the cutting elements having different relief angles and cutting angles depending on a material to be severed.

4. The manual cutting tool as in claim 1, the cutting elements being concavely shaped and being adapted to be connected with the stationary and movable cutting means in a precise fit by centering means.

5. The manual cutting tool as in claim 1, the replaceable cutting elements having different hardness levels depending on a material to be severed.

6. A manual cutting tool for cutting cables, steel cord, rods to size, comprising:
   stationary cutting means connected to a stationary handle; and
   movable cutting means adapted to be moved against the stationary cutting means by a movable handle and transmission means,
   said stationary and movable cutting means having associated therewith replaceable, concavely shaped cutting elements adapted to be connected in a frictional and shape lock,
   the stationary and movable cutting means having pivot bores through their front free ends opposite the handles,
   said pivot bores having passed therethrough a shank screw about which said movable cutting means can be pivoted relatively to the stationary cutting means,
   said pivot bores extending asymmetrically through the front free ends of the stationary and movable cutting means, and said front free ends having formed thereon a radially outer portion of increased material thickness and a radially inner portion of reduced material thickness.

7. The manual cutting tool as in claim 6, said replaceable cutting elements being flat shoulder-less mirror-image plate elements cut from solid full-hardened rod material.

8. The manual cutting tool as in claim 6, the cutting elements having chamfers at their front free ends and by the cutting elements each being adapted to be placed by said chamfers under internally located reduced-thickness portions of the respective opposite one of the stationary and movable cutting means.

9. The manual cutting means as in claim 6, the cutting elements having mutually facing relief angles merging with corresponding chamfered cutting angles of the stationary and movable cutting means.

10. The manual cutting tool as in claim 6, the stationary and movable cutting means having mutually facing guide shoulders, and the cutting elements having shoulders for inserting the cutting elements flush into the guide shoulders of the stationary and movable cutting means.

11. The manual cutting tool as in claim 6, said replaceable cutting elements having in their rear surfaces holding grooves by means of which they are floatingly mounted in a frictional and shaped-locked manner in the stationary and movable cutting means on matingly shaped holding tabs located in the region of guide shoulders of the stationary and movable cutting means.

* * * * *